Figure 1:
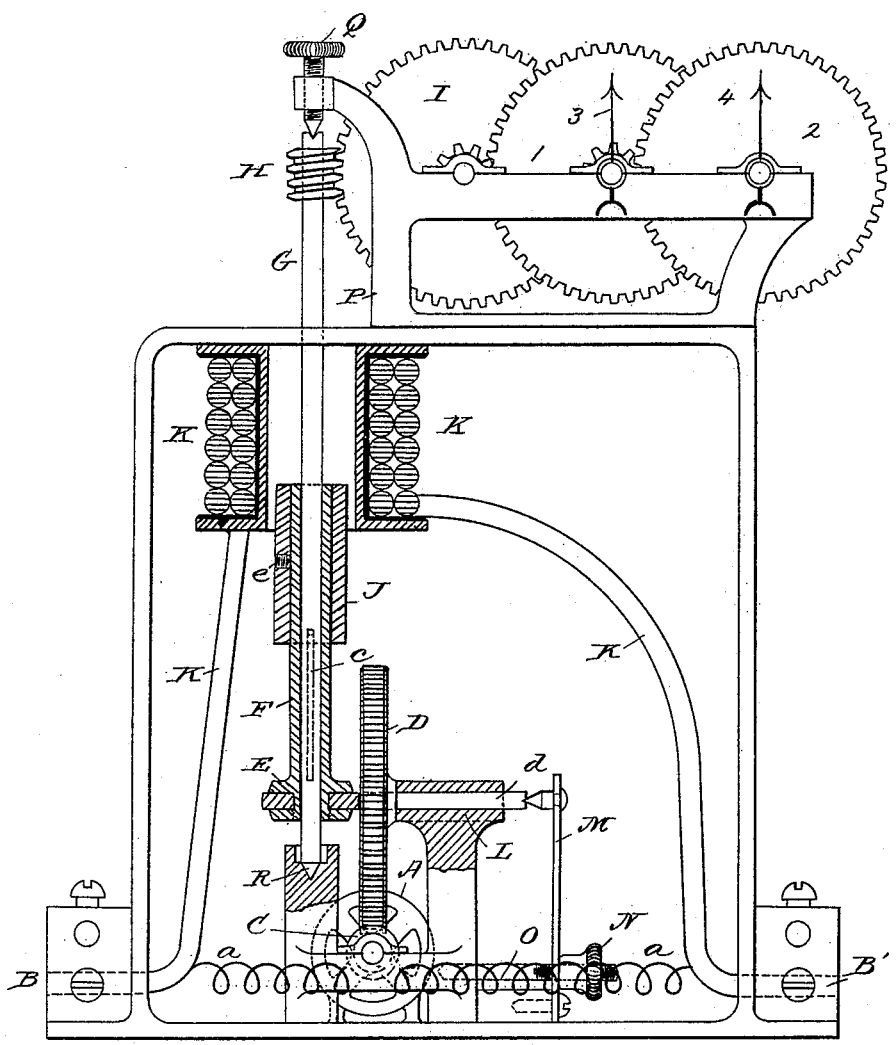

(No Model.) 2 Sheets—Sheet 1.

A. RECKENZAUN & J. A. PENTZ.
ELECTRIC METER.

No. 394,880. Patented Dec. 18, 1888.

WITNESSES:
Alfred T. Gage
Wm. L. Speidel

INVENTORS:
Anthony Reckenzaun
James A. Pentz
by Wm. G. Henderson, Atty.

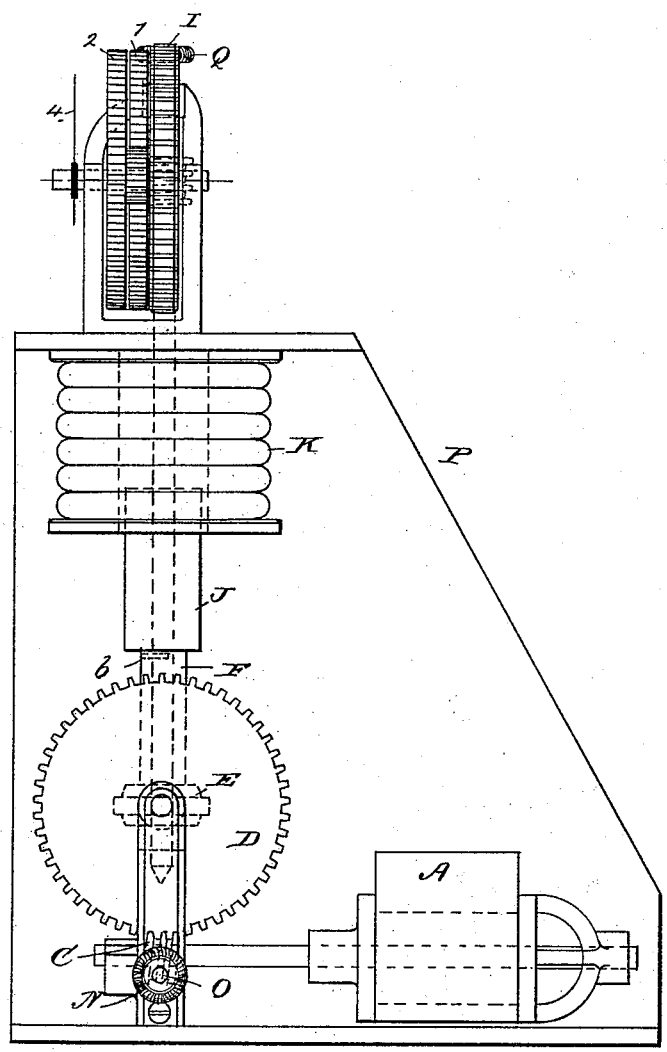

UNITED STATES PATENT OFFICE.

ANTHONY RECKENZAUN AND JAMES A. PENTZ, OF PHILADELPHIA, PENNSYLVANIA.

ELECTRIC METER.

SPECIFICATION forming part of Letters Patent No. 394,880, dated December 18, 1888.

Application filed January 20, 1888. Serial No. 261,405. (No model.)

*To all whom it may concern:*

Be it known that we, ANTHONY RECKENZAUN, of London, England, a subject of the Queen of Great Britain, and JAMES A. PENTZ, a citizen of the United States, both residing at Philadelphia, in the county of Philadelphia and State of Pennsylvania, have invented certain new and useful Improvements in Electric Meters; and we do declare the following to be a full, clear, and exact description of the invention, such as will enable others skilled in the art to which it appertains to make and use the same, reference being had to the accompanying drawings, and to the letters and figures of reference marked thereon, which form a part of this specification, and in which—

Figure 1 is a side elevation with parts in vertical section. Fig. 2 is an end elevation.

The object of the invention is to provide means for measuring the amount of electrical energy flowing through a given circuit in a given time.

This instrument consists, essentially, of a motor capable of turning the registering mechanism. This motor may be any suitable means. It may be a device worked by springs or by compressed air, or raised weights, or any other kind of power; but it is preferred to utilize an electric motor for this purpose. Such electric motor, of any known construction and represented by A, is connected in shunt to the main current by means of thin wires $a\ a$. The armature and field-magnets of such motor will be wound in such a manner that the speed of the motor is constant with a constant potential at the terminals B B' of the meter or instrument.

The motor A carries on its spindle a worm, C, which gears into a worm-wheel, D, which is "faced" on one side. Against this face works a friction wheel or roller, E. This friction-wheel is attached to a tube, F, say of brass. This brass tube is threaded upon the steel spindle or shaft G and is capable of sliding up and down. In order that the spindle G may revolve with the brass tube F, a pin, $b$, is put into spindle G, which pin projects through a long slot, $c$, in tube F. This slot allows the brass tube to slide up and down if pressure is applied to it. Upon the upper end of spindle G is placed another worm, H, which actuates worm-wheel I, to which a train of wheels, as 1 and 2, is geared.

J represents a tube or core of wrought-iron attached to brass tube F by suitable means— say by set-screw $e$.

K represents a wire coil or solenoid. Whenever a current is passing through the solenoid K, the solenoid will suck the iron J into it, and the greater the current the stronger will be this attraction or suction.

The shaft $d$ of worm-wheel D is journaled in a suitable box, L, and against its end bears an arm or spring-plate, M, the pressure of which against the end of the shaft $d$ to keep the worm-wheel and friction-wheel in contact may be regulated by a screw or a thumb-nut, N, on a pin, O, having its bearing in the post of the boxing L. The framing P may be of any suitable construction, and a screw, Q, may be employed to center and hold shaft G on its step R.

The *modus operandi* is as follows, viz: Terminals B and B' of the meter will be joined to any electric-supply circuit the energy of which it is desired to measure. As soon as the current is switched on, and not until then, the constant-speed motor A will revolve. Let it be assumed that no current is required by the main circuit, the motor A then will only consume a very small fraction of energy necessary for its own propulsion, and at such time the friction-roller E will be in the center of worm-wheel D, its normal position. When the flow of current is caused by electric lamps or other engery-consuming apparatus being put in action, the core J will be sucked up into the solenoid K, and simultaneously the friction-roller E will be raised out of the center of worm-wheel D, which keeps on revolving and causes the roller E to revolve with it. The greater the current in the solenoid K the farther will the friction-roller E be moved away from the center of the worm-wheel D. The speed of worm C being constant, the revolutions of friction-wheel E and spindle G will be in proportion to the radial displacement of wheel or roller E. Consequently the more energy there is consumed the faster will roller E and everything attached to it run, so that there is formed a variable-speed gear. Worm-wheel I drives the set of wheels 1 and 2, provided with the pointers or hands 3 and 4, which will indicate on a suitable scale formed, say, on the face of the train-wheels the number of revolutions per hour or per day or any convenient unit of time. The train of wheels, pointers, and scales may be arranged in any well-known way, so that one will show units, another tens, another hundreds, &c., and the parts of the instrument are so proportioned that given numbers of revolutions of the pointers will indicate a corresponding number of lamp-hours, or ampère-hours, or horse-power hours, as the case may be. This principle allows of various modifications which need not be specified. The shape of iron core J may be variously arranged to suit the magnetic effects of the current. It may be made to taper, or it may be weighted gradually as it rises, by picking up washers or disks placed inside the solenoid, or it may be balanced by a spring, if desirable. These features are not specifically claimed, and, being well understood, need not be illustrated and particularly described.

Having described our invention and set forth its merits, what we claim is—

1. In an electric meter, the combination of a register or indicator, a shaft for transmitting motion thereto, a constant-speed motor, a wheel deriving a constant-speed movement therefrom, a sleeve mounted on said shaft to rotate therewith and slide thereon, and to gravitate downward, a variable-speed friction wheel or roller connected with said sleeve and bearing against the face of said constant-speed wheel to derive rotative movement from it, a core connected with said sleeve, and a solenoid energized from the main current and influencing said core to change the point of contact of said variable-speed wheel with the constant-speed wheel to vary the speed of the former in proportion to the energy consumed, substantially as described.

2. In an electric meter, the combination of the rotating shaft G, provided with worm H at one end to transmit motion to a registering mechanism, a sleeve, F, mounted on said shaft to slide thereon and turn the same and carrying a friction-wheel, E, and core J, turning therewith, a constant-speed worm-wheel, D, against the face of which said friction-wheel bears, a worm, C, meshing with said worm-wheel, a constant-speed motor for revolving said worm, and the solenoid actuated by the energy to be measured for changing the bearing-point of said roller on the face of said worm-wheel to vary the speed of said roller, substantially as described.

In testimony whereof we affix our signatures in presence of two witnesses.

A. RECKENZAUN.
JAMES A. PENTZ.

Witnesses:
 ROBT. S. GLASS,
 H. F. REARDON.